(12) United States Patent
Joeressen et al.

(10) Patent No.: US 6,212,660 B1
(45) Date of Patent: Apr. 3, 2001

(54) METHODS AND APPARATUSES FOR IDENTIFICATION OF THE POSITION OF DATA PACKETS WHICH ARE LOCATED IN A SERIAL RECEIVED DATA STREAM

(75) Inventors: Olaf J. Joeressen, Dusseldorf; Gregor Schneider; Uwe Zwickler, both of Bochum, all of (DE)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/136,571

(22) Filed: Aug. 19, 1998

(30) Foreign Application Priority Data

Aug. 21, 1997 (DE) .............................. 197 36 434

(51) Int. Cl.⁷ .................................................. H03M 13/00
(52) U.S. Cl. ...................... 714/758; 714/776; 370/469; 370/473; 370/476
(58) Field of Search ................................. 714/758, 701, 714/752, 749, 776, 712, 715, 794, 807, 819; 370/469, 473, 476, 241; 708/530

(56) References Cited

U.S. PATENT DOCUMENTS

| 5,408,504 | 4/1995 | Ostman ................................ 375/354 |
| 5,590,160 | 12/1996 | Ostman ................................ 375/367 |
| 5,889,864 | * 3/1999 | Smith et al. ........................ 713/170 |
| 6,047,304 | * 4/2000 | Ladwig et al. ..................... 708/530 |
| 6,052,819 | * 4/2000 | Barker et al. ...................... 714/776 |

FOREIGN PATENT DOCUMENTS

| 3735377 A1 | 4/1989 | (DE) . |
| 0 407 903 B1 | 1/1991 | (EP) . |
| 0 758 168 A1 | 2/1997 | (EP) . |
| 9-23215 | 1/1997 | (JP) . |
| WO 82/01094 | 4/1982 | (WO) . |

OTHER PUBLICATIONS

B–ISDN user–network interface–Physical layer specification: General characteristics, pp 1–16.

* cited by examiner

Primary Examiner—Emmanuel L. Moise
(74) Attorney, Agent, or Firm—Perman & Green, LLP (57) ABSTRACT

The description covers the identification of the position of data packets (P1, P2, . . . ) which are located in a serial received data stream and each have check data in a check field and a check sum (CRC) which is formed using the check data, the received data stream being passed in serial form through at least one comparison unit (9) which forms a new check sum (CRC') with each received signal to be newly added and compares this new check sum with data which are looked at for the associated received check sum (CRC), and, furthermore, during the comparison, the influence of all data is eliminated which do not belong to the check data and to the check sum (CRC).

19 Claims, 6 Drawing Sheets

METHODS AND APPARATUSES FOR IDENTIFICATION OF THE POSITION OF DATA PACKETS WHICH ARE LOCATED IN A SERIAL RECEIVED DATA STREAM

BACKGROUND OF THE INVENTION

1. Field of the Invention

The invention relates to a method and apparatuses for identification of the position of data packets which are located in a serial received data stream.

2. Description of Related Art

Data packets in the transmission system used as the basis here contain a part of fixed length and a part of variable length. The part of fixed length may be called a check field and contains information about the length of the part of variable length.

If the data packets are transmitted via a channel which is noisy, then they can be interfered with on the transmission path, for example in the case of packet-oriented digital radio transmission. Even entire packets may be lost.

However, within the data stream, the starting points and end points of the respective data packets are intended to be detected at the receiver end. In order to make it possible to identify a data packet at the receiver end, that is to say to identify a packet position, a known bit sequence is normally introduced into the data stream at the transmitter end. At the same time, a logic device ensures that bit sequences which are identical to this are eliminated from the data stream. This is normally achieved by means of additional symbols which, admittedly, change the word but leave the useful information to be transmitted otherwise unchanged.

Another option would be to transmit ancillary information as well in the bundle structure of the system which is transmitting the data.

In the case of conventional data transmission, it is furthermore known for the transmission to be checked for errors by inserting a check sum into the data packet to be transmitted, which check sum is formed on the basis of check data which are located in a check field. At the receiver end, a new check sum is then formed in the same manner on the received check data and is compared with the received check sum. If this comparison produces a match, the transmission was error-free.

BRIEF SUMMARY OF THE INVENTION

The invention is based on the object of developing a method and apparatuses of the type mentioned initially such that the position of a data packet in a continuous data stream can be determined more easily.

In the case of the method according to the invention for identification of the position of data packets which are located in a serial received data stream and each has check data in a check field and a check sum which is formed using the check data, the received data stream is passed in serial form through at least one comparison unit which forms a new check sum with each received symbol to be newly added and compares this new check sum with data which are looked at for the associated received check sum, in which case, furthermore, during the comparison, the influence of all data is eliminated which do not belong to the check data and the check sum. A data stream bit which is in each case is to be newly added may be regarded, for example, as a received symbol. Alternatively, the received symbol may be a group with a predetermined number of bits.

Thus, according to the invention, the serial data stream is continually examined for valid code words at the receiver end, to which code words the data in the check field and the data in the check sum belong. Only when the received check sum and the check sum formed at the receiver end from the received check data match has a valid code word been found, and the position of the data packet in the data stream thus identified. At the same time, the data in the check field have then also been received without any errors, so that reliable information is now available, for example about the length of the overall data packet. Since, according to the invention, the received data stream is continually examined for code words, it is necessary to ensure that data and the bits located outside the code words have no influence on the abovementioned comparison.

The influence of these data and bits on the comparison is therefore eliminated in order to achieve correct position identification.

The solution according to the invention has the following advantages over the previously known solutions:

1. The method according to the invention is superior to simple insertion of a known bit sequence for identification of the position of data packets, since, in the case of the invention, the inserted bit sequence can be identified correctly by the receiver only if not only the bit sequence itself but also a fixed length part of the packet has been received without errors. For this reason, the invention not only assists with frame synchronization but also helps to ensure that valuable data located in the check field, for example length information, are received correctly.

2. The invention places no requirements on the fundamental transmission scheme and does not demand that the packets must be inserted in a specific manner into a bundle which is just about to be transmitted. This therefore means that the absolute position of data fields in the data packets is not specified. Furthermore, for example, the field for the check sum on the check field itself, on the basis of whose data the check sum has been formed, do not need to follow one another directly.

3. The invention can furthermore be implemented at low cost and on a small area as hardware in a digital integrated circuit.

BRIEF DESCRIPTION OF THE DRAWINGS

Exemplary embodiments of the invention will be described in detail in the following text with reference to the drawing, in which.

DETAILED DESCRIPTION

In transmission systems, errors frequently occur owing to the characteristics of the transmission channel. A transmission system described here according to FIG. 1 comprises a source 1 which is designed as a transmitter and sends data via a transmission channel 2 to a receiver which is designed as a sink 3. The transmission channel 2 may be a radio channel.

Figure 1:
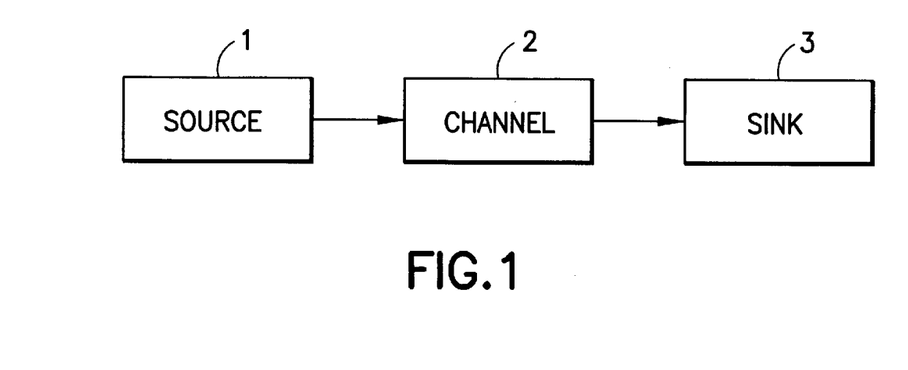
FIG. 1 shows a model of a transmission system.

The transmission system transmits data packets in a serial sequence in bundles, so-called bursts. If any errors occur in the transmission channel then, under some circumstances, complete bundles may be lost so that the data arriving at the receiver are unusable.

This is particularly critical when data packets of variable length are being transmitted, in which the receiver of the data packets expects the starting point of the next data packet to be immediately after the preceding data packet. For this reason, the length of the data packet is always transmitted in a header part that is part of the packet. If, owing to transmission errors or loss of bundles, this length information is not received correctly, the receiver cannot find the next data packet. It is thus necessary to ensure that the starting point of the respective data packets can be detected reliably.

Figure 2:
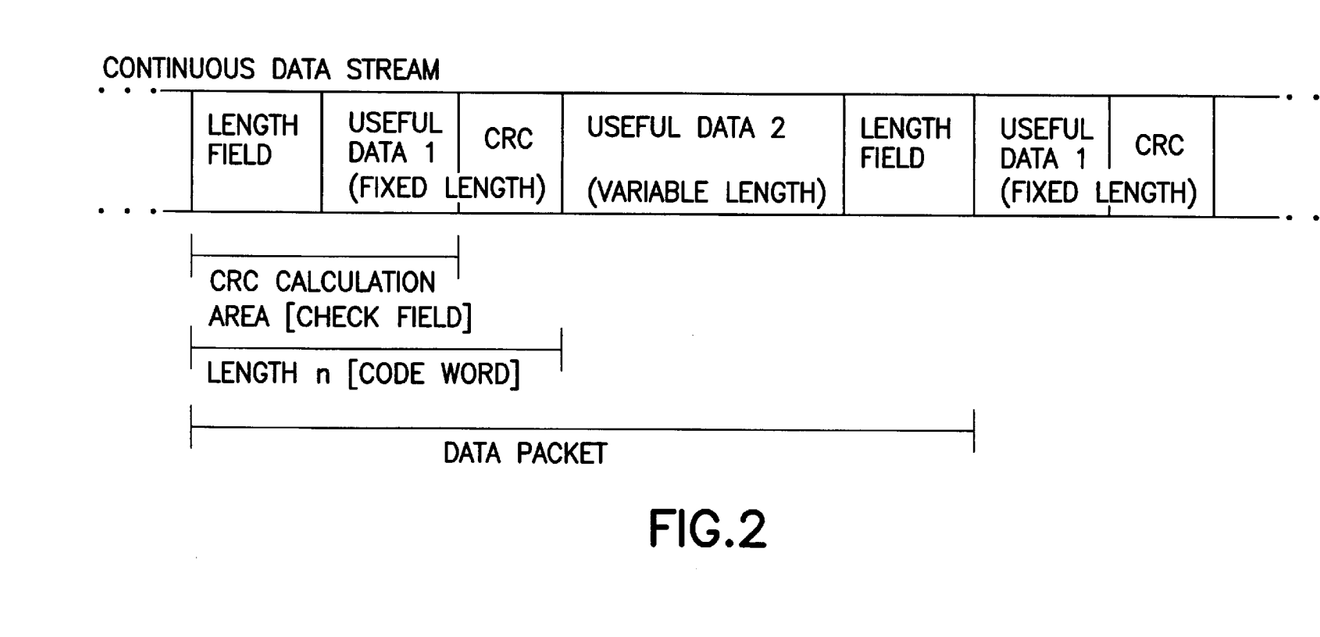
FIG. 2 shows a data packet in the transmission system according to FIG. 1.

According to FIG. 2, which shows the design of data packets in a continuous data stream, a check sum is thus inserted into each of the data packets at the transmitter end, before the data packets are sent, for example via a digital radio transmission system. The check sum may be a CRC code, that is to say a code for cyclic redundancy checking (cyclic redundancy check code). Alternatively, the check sum may be formed in another manner, if desired.

Each data packet according to FIG. 2 has a first part of fixed length, which is called the CRC calculation area or check field. This CRC calculation area includes a length field and a useful data field for useful data 1. The length field contains, inter alia, information about the length of the entire data packet. The useful data 1 may be data which are regarded as being worthy of protection.

The CRC code which is inserted into the data packet is calculated with a fixed length over a part or over the entire area, for example over a part or over the entire area of the CRC calculation area. This inserted CRC code is used at the receiver end to determine the packet position. It is furthermore used, at least, for protecting the length information.

Preferably, that part of the data packet which is protected by the CRC code is a cohesive area in front of that position at which the CRC code is inserted. Although this is not generally required, this simplifies the implementation and is used as a precondition in the rest of the description.

The packet structure according to FIG. 2 thus comprises, before transmission, the length field, followed by the field for useful data 1 which in turn is followed by the field for the CRC code and, finally, the field of variable length for the useful data 2, the information about the length of the useful data field 2 being present in the length field. In this case, the CRC code protects both the length field and the useful data field 1. In addition, the CRC code is used at the receiver end to identify the starting point of the data packet or another specific position in a desired data block.

In order to achieve this, a code word which corresponds to the length n is checked at the receiver end. The value n is in this case the number of bits which belong to the length field, to the field for the useful data 1 and to the CRC code.

Figure 3:
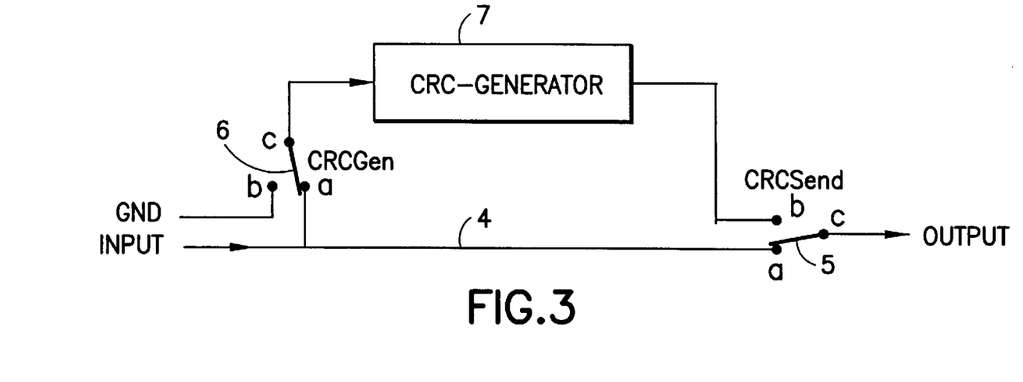
FIG. 3 shows a circuit arrangement for inserting a CRC check code (Code for Cyclic Redundancy Checking or Cyclic Redundancy Check Code) into a continuous data stream.

FIG. 3 shows a circuit arrangement with whose aid the CRC code is produced and is inserted into the continuous data stream.

A data line 4 extends from an input via a first switching contact a of a first changeover switch 5 and its common contact c to an output. Furthermore, the input is connected via a first switching contact a of a second changeover switch 6 and its common contact c to an input of a CRC generator 7, whose output is connected to a second switching contact b of the first changeover switch 5. A second switching contact b of the second changeover switch 6 is connected to reference-earth potential GND (earth). The common contact c of the first changeover switch 5 is connected via further processing stages to the transmission channel.

If the data packet according to FIG. 2, which does not yet contain the CRC code (check sum), is supplied to the circuit arrangement according to FIG. 3 via the input, then the length field and the field for the useful data 1 are passed both to the output of the circuit arrangement and, at the same time, to the input of the CRC generator 7. The switch positions now correspond to the positions shown in FIG. 3. Once the CRC generator has received the entire CRC calculation area and has calculated the CRC code, the first changeover switch 5 and the second changeover switch 6 are switched over, so that the calculated CRC code is now passed via the first changeover switch 5 to the output. The first changeover switch 5 is now switched over once again, so that the useful data 2 can now be transmitted in the field of variable length, via the data line 4, to the output.

Figure 4:
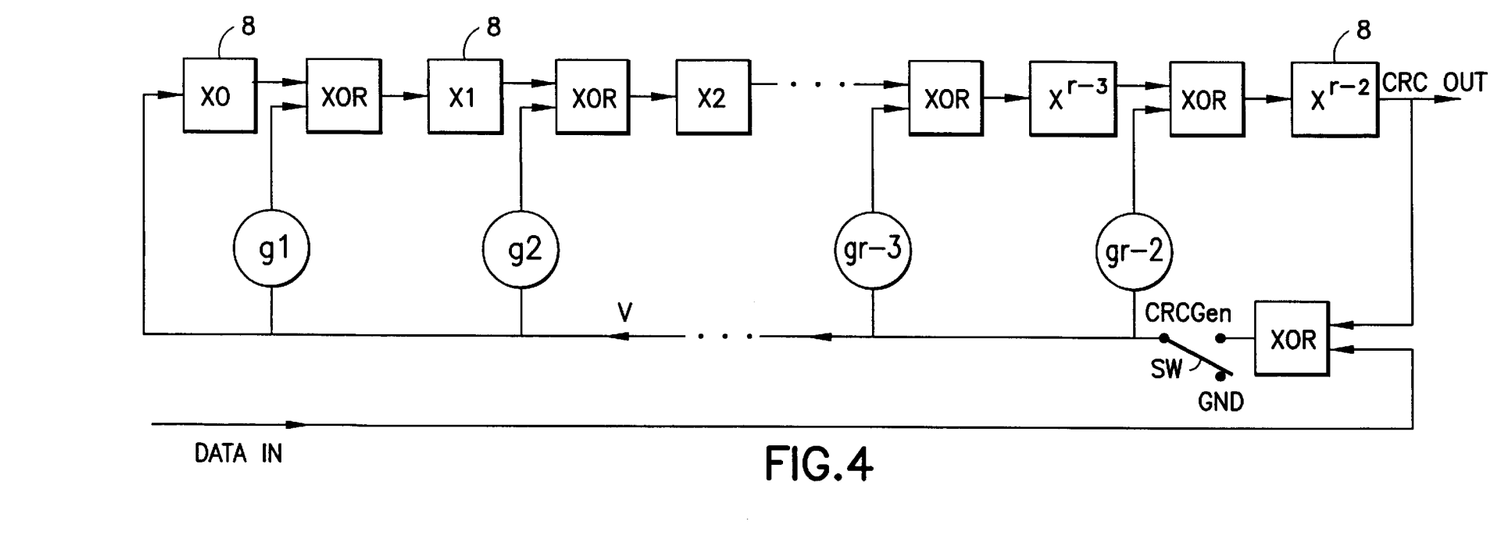
FIG. 4 shows a CRC generator for producing the CRC check code.

The CRC generator 7 calculates the CRC code via the check field (for example 48 bits), and is designed as illustrated in FIG. 4.

The data bits in the check field are passed to the CRC generator. This comprises, in a manner known per se, r−1 delay elements or flipflops 8 (for example a quantity of 24), which are each linked to one another via an XOR gate. An output signal from a delay element is in each case supplied to one input of an XOR gate, while the input value V weighted by gi is in each case applied to the other input of the XOR gate, this input value V being a coefficient of a polynomial G(x) calculated by the CRC generator. The polynomial G(x) may be in the form $$G(x) = g_{r-1}x^{r-1} + g_{r-2}x^{r-2} + \ldots + g_1 x + g_0$$

where $g_{r-1} = 1$; $g_0 = 1$ r−1: degree of the polynomial G(x).

The output of the CRC generator, which is passed to the first switch 5, is furthermore applied to the input of a further XOR gate, to whose other input the input data are applied. The output from this XOR gate is connected via a switch sw to the first delay element $x_0$, and via the weighting factors gi to the XOR gates in the delay chain.

If it is intended to calculate a CRC code, the switch sw is moved to the position CRC Gen. If the data in the check field are now entered in series, the CRC bits are located in the registers $x_0$ to $x_{r-2}$ at the end of this process. The switch SW is now connected with reference potential Gnd. This means that zeros are shifted into the registers during each further clock cycle. At the same time, the calculated CRC bits are shifted in serial form out of the CRC generator.

The CRC code of r−1 bits inserted into the data stream forms, together with the CRC calculation area in FIG. 2, the code word which, in the present case, is n=72 bits long.

At the receiver end, the unit which is intended to process further the received data packets requires the length information of a respective packet in order to define the starting point of the following data packet. This is dependent on always knowing the position of the length field. This also means that the unit cannot be synchronized again once the length information has been subject to interference, since the start of the next data packet can no longer be defined.

The overall processing unit solves these problems by finding valid code words as follows:

if the CRC identification is successful, then the position of the data packet is known at the start;

in this case, the reliability of the transmitted data in the CRC calculation area, in particular the length information, is also ensured.

If, on the other hand, the CRC identification fails, this means that the data have been subjected to interference and that the length information is probably not correct. In this case, the processor unit has to wait until synchronization can be achieved again, with the aid of the CRC identification.

Figure 5:
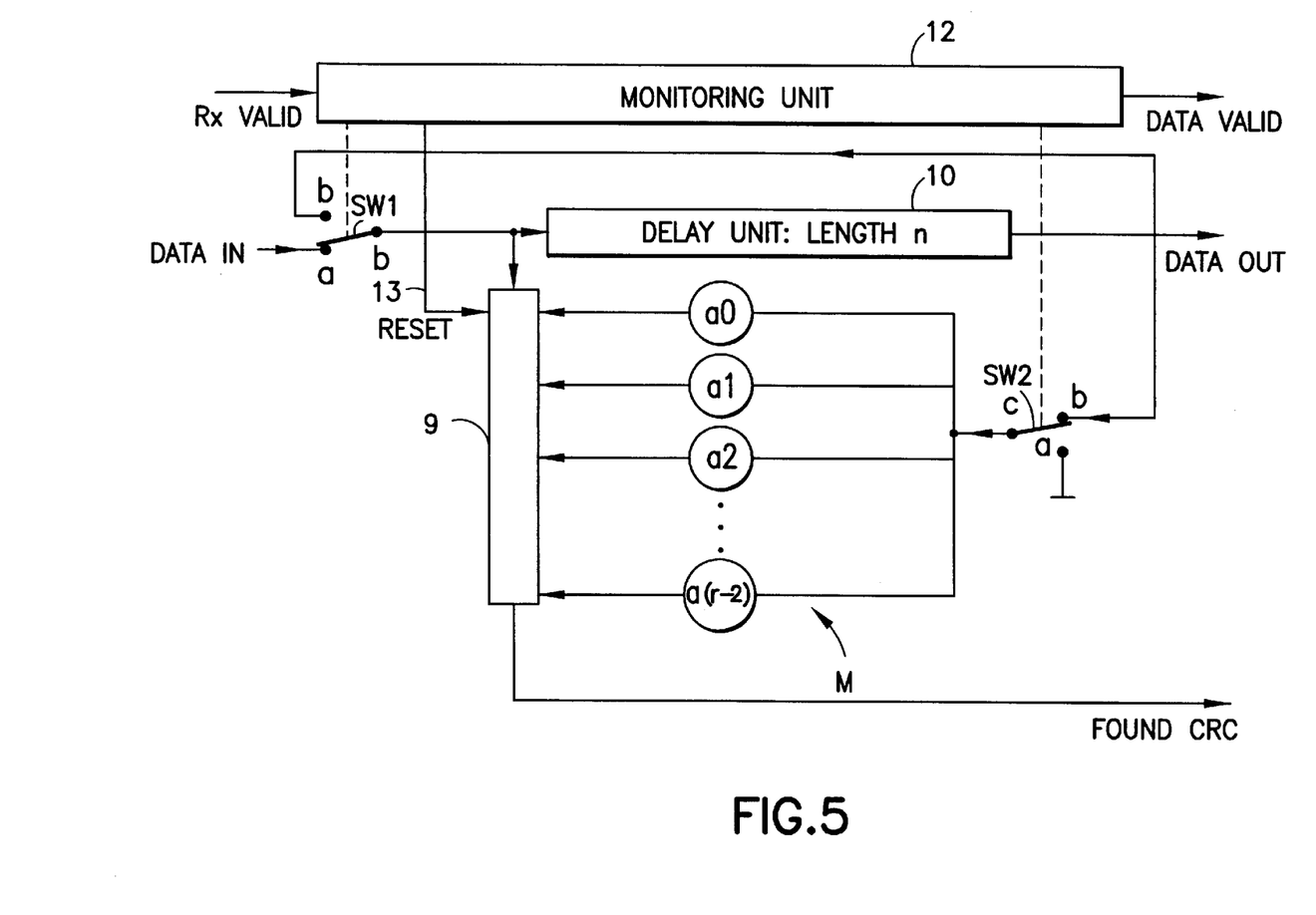
FIG. 5 shows a circuit arrangement for smooth CRC evaluation in a continuous data stream.

FIG. 5 shows a circuit arrangement for identification of the position of a data packet in a continuous or bit-serial data stream.

This circuit arrangement has a CRC comparison device 9, which comprises a shift register with a length of r−1 bits, as is still to be explained. The CRC comparison device 9 is supplied on the input side with the serial input data, via a changeover switch sw1. The common contact c of the changeover switch sw1 is in this case connected to an input contact a, which is connected to the input of the circuit arrangement. In this switch position, the input data are also passed into a delay unit 10, whose input is connected to the input of the CRC comparison device 9. The delay unit 10 comprises a shift register of length n, its output being connected to the output of the circuit arrangement according to FIG. 5. The output of the delay unit 10 is furthermore connected to a further contact b of the changeover switch sw1 in order that it is possible, once the switch sw1 has switched over, to pass this output to the input of the delay unit 10 or to the input of the CRC comparison device 9. Furthermore, the output of the delay unit 10 is connected to a switching contact b of a changeover switch sw2, in order that it is possible to supply this output via this changeover switch sw2 and its common contact c to a feedback stage 11 with the weighting factors $a_i$. This feedback stage 11 erases from the CRC comparison device 9 the influence of those data bits which leave the delay unit 10, so that the extent of the memory of the CRC comparison device 9 is reduced to n.

A monitoring unit 12 is used for switching over the switches sw1 and sw2 as a function of an input signal RxValid, which is produced as a function of the presence of bundles (bursts). When a bundle is transmitted, then RxValid is equal to one, otherwise its zero. The output of the monitoring unit 12 furthermore supplies a signal DataValid which indicates when data at the output of the delay unit 10 may be regarded as valid data.

Furthermore, the monitoring unit 12 is also connected by a line 13 to the CRC comparison device 9, in order to allow the latter to be reset.

Figure 6:
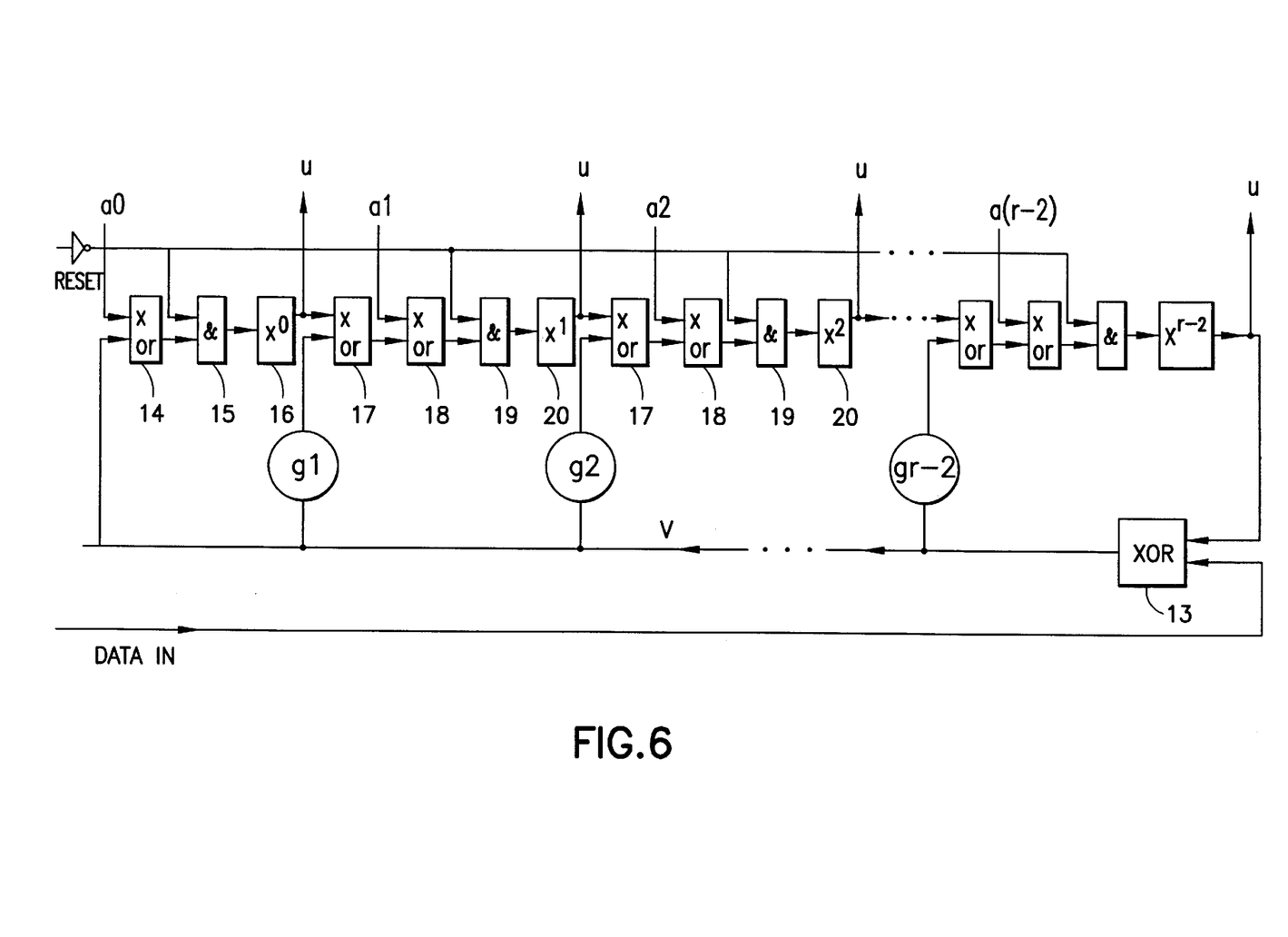
FIG. 6 shows a CRC comparison device used in the circuit arrangement according to FIG. 5.

The design of the CRC comparison device 9 is shown in FIG. 6. This represents a modified design of a shift register with feedback such as that from FIG. 4 as a hardware-efficient solution for identification of a CRC code. The polynomial with which this CRC code is produced can be written as follows:

$$G(x) = g_{r-1}x_{r-1} + g_{r-2}x^{r-2} + \ldots + g_1 x + g_0$$

The polynomial is identical to the CRC calculation unit in FIG. 4. In comparison with the CRC calculation unit in FIG. 4, the hardware design has been expanded by the parallel inputs $a_i$ and the outputs u.

The CRC comparison device 9 contains an XOR gate 13, one of whose inputs is supplied with the continuous data stream. The output of this XOR gate 13 is supplied to one input of a further XOR gate 14, whose other input is connected to the feedback stage 11 in order to receive, from there, the delay value weighted by $a_i$. The output of the XOR gate 14 is connected to an input of an AND gate 15, to whose other input a reset signal can be applied. The output of the AND gate 15 is connected to the input of a delay element 16 (flipflop). The output of this flipflop 16 is supplied to the next stage of the CRC comparison device 9.

This next stage, and all the following stages, of the CRC comparison device 9 each comprise an XOR gate 17 which receives at one input the output of the preceding stage and at another input the feedback value V weighted by gi. The output of the XOR gate 17 is connected to the input of a further XOR gate 18 which receives, at its other input, the delay value (weighted by $a_i$) from the feedback stage 11. The output of the XOR gate 18 is connected to an input of an AND gate 19 which can receive the reset signal at its other input, while the output of the AND gate is in turn connected to the input of the delay element (flipflop) 20 of this stage, etc. Overall, the stages that are present are 0, 1, ... r−2. The output of the last delay element is passed to the other input of the XOR gate 13.

The coefficients $a_i$ supplied to the respective XOR gates 14, 18, ... are the coefficients of the remainder of the polynomial division $$x^n : G(x),$$

where n is once again the length of the code word.

Without any interruption, the CRC comparison device 9 processes the data which arrive via the switch sw1 and are delayed by n bits at the same time by means of the delay unit 10. Once a data bit that has arrived has been delayed by n clock pulses, its influence on the CRC calculation must be eliminated, so that the CRC code is produced only on the basis of the last n bit received. The elimination is carried out by the pulse response of the individual bit being subtracted from the CRC register content (by XOR linking). Mathematically, the pulse response can be represented as the remainder of the division $$x^n / G(x)$$

in this way, the original, infinite memory depth of the CRC can be reduced to the relevant n last bits.

The sliding identification of the CRC position in FIG. 5 is dependent on the switch sw1 being in the position a, so that the arriving data stream is passed directly to the CRC comparison device 9 and to the delay unit. Furthermore, for sliding identification, the switch sw2 must be in position b. When the receiver is started up, the contents of all the registers will initially be "zero" (CRC and delay unit).

Thus, while the CRC identification is being carried out in the CRC comparison device 9, the data are also passed to the delay unit 10. As soon as the data have been shifted out of the delay unit 10, they are fed back via the switch sw2 and the feedback stage 11 to the CRC comparison device 9 in order in this way to use XOR linking (exclusive or) to eliminate the influence on the CRC calculation of data which are older than n clock cycles. In this way, the CRC comparison device 9 can identify the position of a data packet exactly only by using the valid n bits in the code word. Finally, a new check sum CRC' is in this case formed in the CRC comparison device 9 on the basis of the received CRC calculation area, and this new check sum CRC' is compared with data which are looked at for the associated received check sum CRC. Only when the n bits of the code word have been processed by the CRC comparison device 9 and have all been passed to the delay unit 10 does the CRC comparison device supply at its output the desired signal Found CRC. This output is received in such a way that the outputs of the respective delay elements 16, 20, . . . are supplied via lines u to an NOR gate (not illustrated) at whose output the signal Found CRC appears.

If the fundamental transmission scheme is based on bundle transmission (transmission by bursts), the circuit arrangement according to FIG. 5, or the monitoring unit 12 is supplied with an additional signal RxValid in order to indicate the clock cycles in which data are received. In this way, the circuit arrangement identifies the end of a received bundle, and can shift the contents out of the delay unit 10 in order to avoid delaying data until reception of the next bundle starts.

Figure 7:
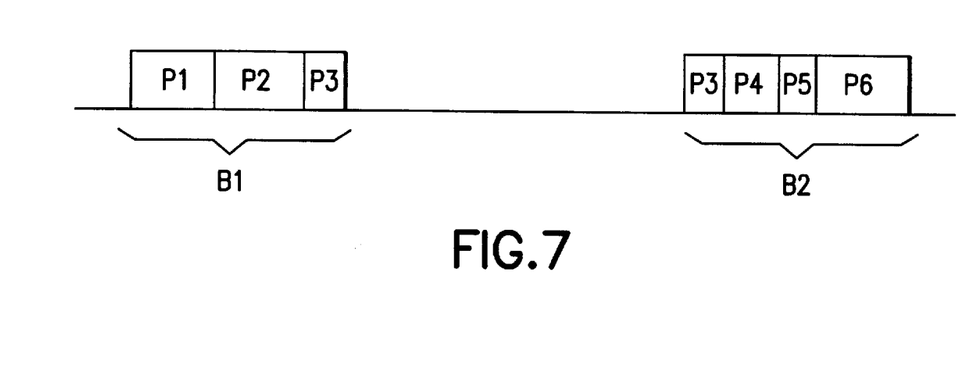
FIG. 7 shows a schematic illustration to explain bundle transmission of data packets.

In this case, the bundle structure is illustrated in FIG. 7. The figure shows two bundles B1 and B2 each having data packets P1, P2, . . . P6. It was no longer possible to transmit the data packet P3 completely in the bundle B1, and it has thus been continued at the start of the bundle B2.

The following sequence describes the use of the switches sw1 and sw2 during bundle transmission.

It is assumed that the packet edges are not coincident with the edges of the bundles B1, B2, so that parts of the packets are transmitted in successive bundles. CRC fields can also be split into different bundles, since the packet structure is under some circumstances not known in the unit which composes the bundles.

FIG. 7 shows that the packet P3 is transmitted in two successive bundles, as already mentioned. The packet P6 can be ended in the second bundle, or is continued in the next bundle.

In principle, the CRC identification in the receiver can be interrupted between the bundles B1, B2. The unit which follows the CRC and obtains the data from the CRC unit will then, however, not receive the last n bits of the packet that has just been received until the CRC unit once again starts the processing of the next received bundle.

In some circumstances, this results in undesirably long delays for some packets.

The method described in the following text provides a solution to this:

1. First bundle is being processed, delay unit 10 contains no valid data (is empty): sw1 and sw2 in position a, DataValid=0, RxValid=1; CRC unit has been reset and is processing the received data. The data are at the same time shifted into the delay unit 10. This state is maintained for the first n clock cycles, until the delay unit 10 has been completely filled with data.

2. Normal processing, delay unit 10 contains valid received data: sw1 in position a, sw2 in position b, DataValid=1, RxValid=1; the CRC unit is processing the new data and subtracts the effect on the calculated CRC output data. The new data are shifted into the delay unit 10. Continuous checking for valid CRC code words.

3. End of the data bundle: Rx changes from 1 to 0. Resetting of the CRC unit to "0" with reset signal from the monitoring unit 12. In this case: DataValid=1.

4. Data which are located in the delay unit 10 are passed on and circulated: Switch sw1 in position b and switch sw2 in position a, Data Valid=1, RxValid=0; contents of the delay unit 1 of circulate once (n clock cycles) and, in consequence, the data are passed on and at the same time are passed back to the CRC unit; recalculation in the CRC unit using fed-back data over n clock cycles.

5. Wait for the next data bundle.

6. Next bundle must be processed, delay unit contains circulated data: Switch sw1 in position a, switch sw2 in position b, DataValid=0, RxValid=1; the same process as in 2 but with DataValid=0; this state continues for n clock cycles.

7. Go to 2.

This method shifts all the data out of the delay unit 10 at the end of the bundle.

In addition, the CRC unit is reset after each bundle. The CRC unit will therefore also operate correctly after each reset, if any unknown internal errors should have occurred.

In order furthermore to minimize the probability of false identifications of (correct) code words, the CRC Found Signal can be linked to a further clock signal. For example, if it is known that the data packet can start only after k clock cycles in each case (for example k is a byte or word limit).

It should be noted that the method described above requires that there must be at least n clock cycles between the successive bundles in order to allow the data to circulate completely in the delay unit.

Solution variant:

A somewhat different method could include a shift register which delays the RxValid Signal by n clock cycles in order to produce the DataValid Signal. This approach does not involve any necessity to receive blocks with a minimum length of n bits. However, the use of a delay circuit 10 is efficient only for small values of n. If n is large, the behaviour of the delay unit 10 should therefore be simulated by counters, in order to optimize the implementation.

After the CRC identification a unit has to process the received data further in order to ensure that packets with a valid structure are passed onto subsequent stages. This unit is shown on the right in FIG. 8, while the circuit arrangement according to FIG. 5 is located on the left in FIG. 8.

The term valid structure means, in particular, that the length information can be used in order to calculate the starting point of the next packet, in order to prevent further subsequent units from losing synchronization.

The further-processing unit therefore has to carry out the following steps:

1. Start packet processing only when the "CRC found" signal indicates the packet position (Found CRC=1).

2. Assess the length information.

3. Remove the CRC block.

4. Transmit the remaining data in such a manner that the subsequent units can calculate the starting point of the next packet from the received information.

5. Start at step 1 again.

In the situation in which a new data packet is found before the present packet has been completed on the basis of the length information (that is to say if data have been lost during the transmission), there are various options for satisfying the requirement of step 4.

Option 1: Ignore the "Found CRC" signal as long as a packet has not yet been completely received or is still being processed. In the event of an error, this would lead to bits from the header part of the next packet appearing in the data of the previous packet. Subsequent units would therefore receive packets with data subject to interference, and would lose the next packet.

Option 2: Method identical to Option 1, but with the packet currently being processed being filled with specified blank data.

The subsequent units would then receive a packet whose data are subject to interference in a clearly defined manner, and would lose the next packet.

Option 3: Method as in Option 2, but the data arriving in the next packet are buffer-stored until these data can be passed onto the subsequent units.

The subsequent unit would then once again receive a packet whose data are subject to interference in a clearly defined manner, but would not lose the next packet.

However, buffer-storage in the subsequent processing device would be necessary.

It should be noted that Option 1 would be very resistant to specific characteristics of the transmitted data. That is to say, if the useful data 2 accidentally contain CRC code words that are likewise valid, this is ignored. The system would accordingly synchronize incorrectly if the transmitted useful data accidentally contained sequences which match a CRC code word.

Figure 9:
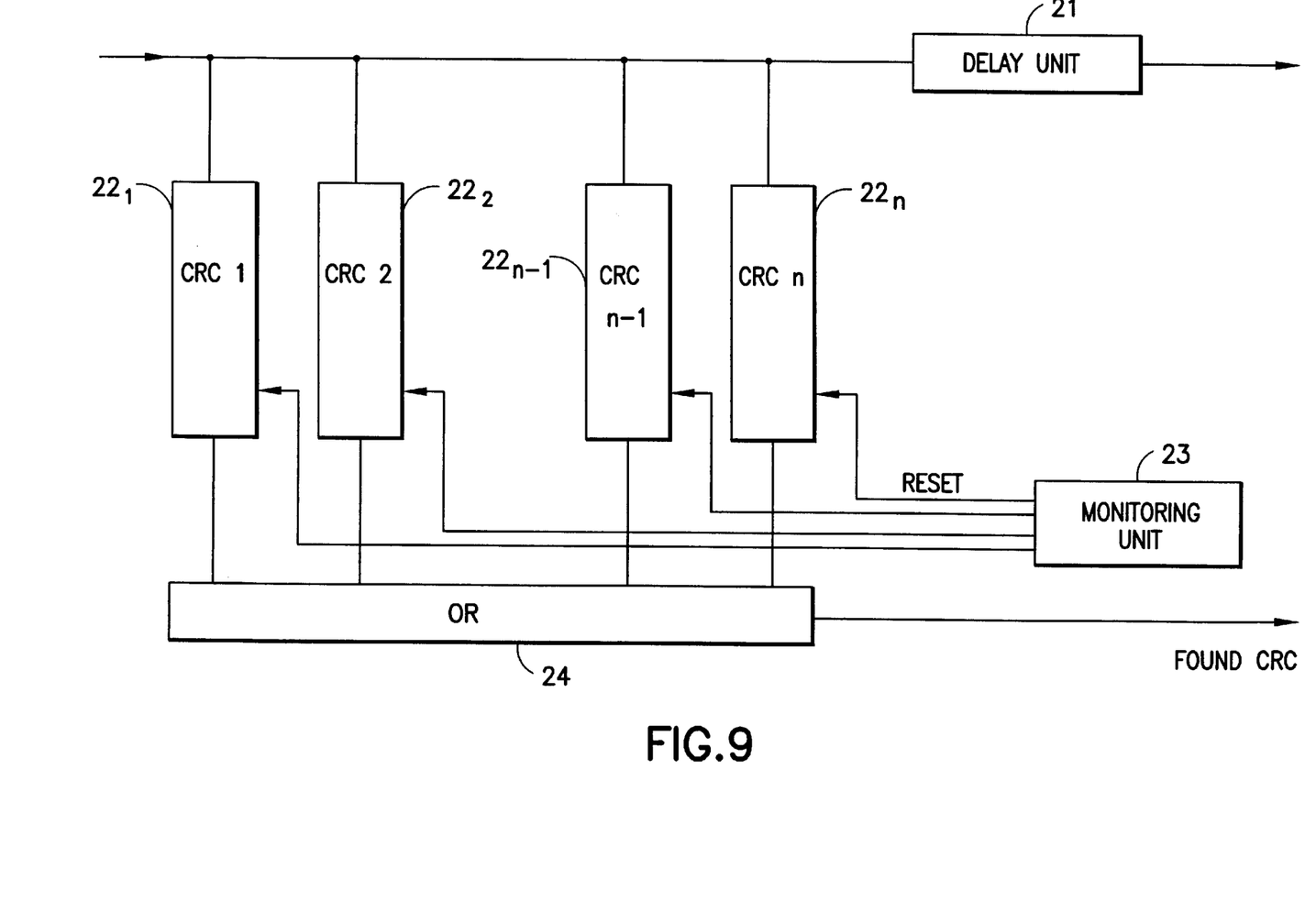
FIG. 9 shows a circuit arrangement according to a further exemplary embodiment of the invention.

FIG. 9 shows a circuit arrangement according to a second exemplary embodiment of the present invention, for sliding CRC identification. However, in terms of hardware, this circuit arrangement is more complex than the first exemplary embodiment.

In this case, the arriving bit-serial data stream is transmitted to a delay unit 21 which may be, for example, a shift register with a length of n bits, in order to hold the code word completely. At the same time, the arriving data stream is passed to n parallel CRC calculation units, whose inputs are connected to the input of the delay unit 21. The CRC calculation units have the reference symbols $22_1$ to $22_n$. Their reset input is in each case connected via a line to a monitoring unit 23. The outputs of the CRC calculation device $22_1$ to $22_n$ are supplied to an OR gate 24 at whose output the Signal Found CRC can be tapped off.

The design of the CRC calculation unit $22_1, \ldots, 22_n$ corresponds to that of the CRC comparison device according to FIG. 6, but without the XOR gates 14, 18 etc. described there, since no coefficients $a_i$ have to be substracted in the exemplary embodiment according to FIG. 9.

The CRC calculation units $22_1, \ldots, 22_n$ are reset in series by the monitoring unit 23 (or by a circulating shift register). Only one of the CRC calculation units can find a valid code word only if this CRC calculation unit is started at exactly the same time as the start of the check data field, that is to say in the exemplary embodiment at the time at which the length field starts. If the check field or the code word has entered one of these CRC calculation units, it is at the same time also present in the delay unit 21.

The CRC calculation unit then sends its Signal Found CRC to the OR circuit 24, to which all the CRC calculation units are connected. As soon as one of the CRC calculation units has sent its Signal Found CRC (Found CRC=1) to the OR circuit, the output of the OR circuit 24 likewise becomes 1. The subsequent processing units then use the Signal Found CRC to identify the fact that the check data field is now coming from the delay unit 21, that is to say the code word.

In the case of the exemplary embodiment according to FIG. 9 as well, the respective CRC calculation units for the respective data packets calculate a new check sum CRC' and compare this with data which are looked at for the associated received check sum in which case, furthermore, during the comparison, the influence of all those data is eliminated which do not belong to the check data and the check sum.

Overall, this elimination is carried out by using a number of CRC calculation units corresponding to the number of bits in the code word, and only one of these CRC calculation units can output the Signal Found CRC.

Figure 8:
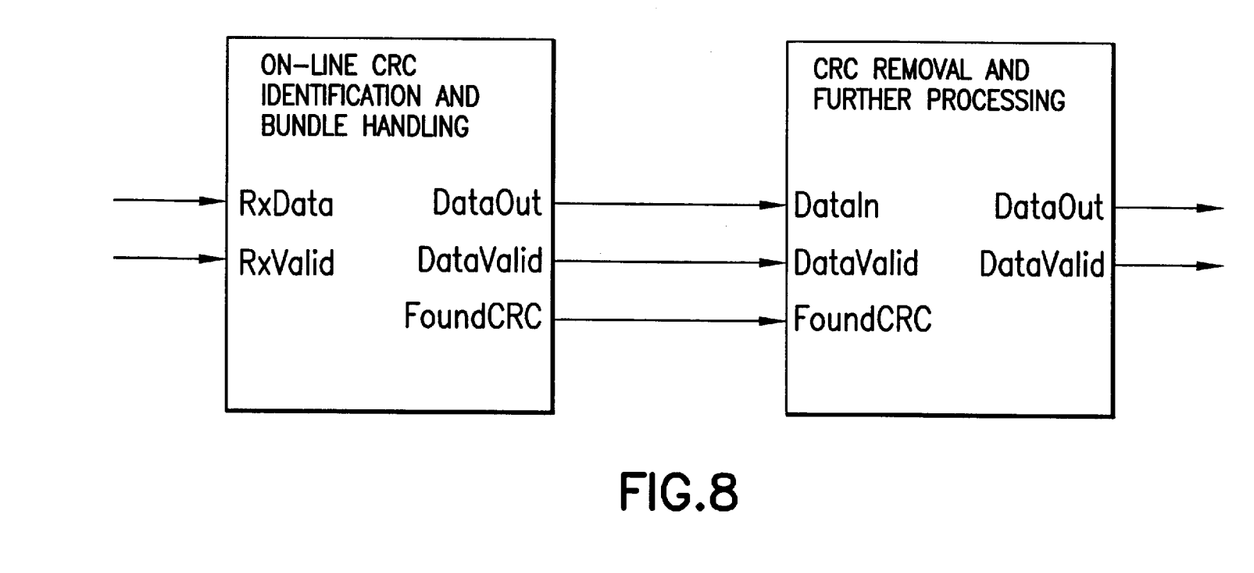
FIG. 8 shows a circuit arrangement at the receiver end, with the circuit arrangement according to FIG. 5 and a downstream stage for CRC removal and further data processing.

The procedure for further bundle transmission has already been described above. Reference is thus made only to FIGS. 7 and 8. The circuit according to FIG. 9 can also be supplemented, corresponding to FIG. 5, by the monitoring unit 12 there to receive the Signal RxValid and to output the Signal Data Valid, as well as by the switch sw1, in order to allow the data stored in the delay unit 21 to circulate at the end of a bundle. The tasks of the monitoring unit 12 can thus also be carried out by the monitoring unit 23 shown in FIG. 9.

What is claimed is:

1. Method for identification of the position of data packets (P1, P2, . . . ) in a serial data stream and each data packet having a unique position in the serial data stream, check data in a check field and a check sum (CRC) which is formed using the check data, said method comprising:

passing the received data stream in serial form through at least one comparison unit (9; $22_1, \ldots, 22_{72}$) which forms a new check sum (CRC') with each received signal to be newly added and compares this new check sum (CRC') with data which are regarded as the associated received check sum (CRC);

determining the position of the data packet in the serial data stream from the comparison of the new check sum (CRC') and the associated received check sum (CRC); and eliminating, during the comparison, the influence of all data which are not associated with the check data and the check sum (CRC).

2. Method according to claim 1, characterized in that, if there is only one comparison unit (9), the received data stream is at the same time also passed in serial form through a delay unit (10) whose length (n) corresponds to the number of bits of check data and check sum, and in that the output signal of the delay unit (10), weighted by values ($a_i$), is used to influence the comparison which is carried out in the comparison unit (9).

3. Method according to claim 2, characterized in that the values ($a_i$) are the coefficients of the remainder of the polynomial division $$x^n : G(x).$$

4. Method according to claim 1, characterized in that the check sum (CRC) is calculated from the check data.

5. Method according to claim 4, characterized in that the calculation of the check sum (CRC) and the new check sum (CRC') is in each case carried out using a polynomial $$G(x) = g_{r-1} x^{r-1} + g_{r-2} x^{r-2} + \ldots + g_1 x + g_0$$

where $g_{r-1} = 1$; $g_0 = 1$ where x and r mean:

x = variable of the polynomial r−1 = degree of the polynomial.

6. Method according to claim 1, characterized in that, when a check sum (CRC) is identified by the comparison, a signal (Found CRC) which indicates the identification is linked to a signal which contains additional information.

7. Apparatus for identification of the position of data packets (P1, P2, . . . ) which are located in a serial received data stream and in each case have check data in a check field and a check sum (CRC) which is formed using the check data, characterized by
- a comparison unit (9) through which the received data stream is passed in serial form and which forms a new check sum (CRC') with each received symbol to be newly added and compares this new check sum with data which are looked at for the associated received check sum (CRC), the comparison unit determining the position of the data packet in the serial data stream from the comparison of the new check sum (CRC') and the associated received check sum (CRC);
- a delay unit (10) which likewise receives the received data stream in serial form and whose length (n) corresponds to the number of bits of check data and in the check sum (CRC); and
- a feedback state (11), which is located between the output of the delay unit (10) and further inputs of the comparison unit (9), for forming values in order to eliminate the influence on the comparison of all data which do not belong to the check data and the check sum (CRC).

8. Apparatus according to claim 7, characterized by a first changeover switch (sw1) via which either the received data stream or the output of the delay unit (10) can be transmitted to the comparison unit (9) and to the delay unit (10), and a second changeover switch (sw2), via which either the output of the delay unit (10) or a reference potential can be transmitted to the feedback stage (11).

9. Apparatus according to claim 8, characterized by a monitoring unit (12) for controlling the switch positions of the changeover switches (sw1, sw2).

10. Apparatus according to claim 9, characterized by a line connection for supplying a reset signal from the monitoring unit (12) to the comparison unit (9).

11. Apparatus according to claim 7, characterized in that the comparison unit (9) is designed as a shift register with feedback, and a check sum (CRC) is calculated using the polynomial $$G(x)=g_{r-1}x^{r-1}+g_{r-2}X^{r-2}+\ldots+g_1x+g_0$$

where $g_{r-1}^{-1}$; $g_0=1$ where x=variable of the polynomial and r−1=degree of the polynomial, and in that the comparison unit (9) has parallel inputs for coefficients ($a_0, \ldots a_{r-2}$) which can be injected into the respective converter stages via exclusive OR gates (XOR).

12. Apparatus according to claim 7, characterized in that a stage for removing the check sum (CRC) from the received data stream is connected downstream from said apparatus.

13. Apparatus for identification of the position of data packets (P1, P2, . . . ) which are located in a serial received data stream and in each case have check data in a check field and a check sum (CRC) which is formed using the check data, characterized by
- a number of parallel-connected comparison units ($22_1, 22_2, \ldots, 22_n$) which corresponds to the number of bits of check data and in the check sum (CRC), through which comparison units the received data steam is passed in serial form and which form a new check sum (CRC') with each received signal to be newly added and compare this new check sum with data which are looked at for the associated received check sum (CRC), the comparison units determining the position of the data packet in the serial data stream from the comparison of the new check sum (CRC') and the associated received check sum (CRC);;
- a delay unit (21) which likewise receives the received data stream in serial form and whose length (n) corresponds to the number of bits of check data and in the check sum (CRC); and
- a logic gate (24), which is connected tot he output of all the comparison units, for supplying a signal (Found CRC) when the comparison is found to be positive in one of the comparison units.

14. Apparatus according to claim 13, characterized in that the logic gate (24) is an OR gate.

15. Apparatus according to claim 13, characterized in that the contents of the delay unit (21) can be fed back via a switch to its input.

16. Method for identification of the position of data packets (P1, P2, . . . ) in a serial data stream and each data packet having a unique position in the serial data stream, check data in a check field and a check sum (CRC) which is formed using the check data, said method comprising:
- passing the received data stream in serial form through a comparison unit (9), the received data stream is at the same time also passed in serial form through a delay unit (10) whose length (n) corresponds to the number of bits of check data and check sum, and in that the output signal of the delay unit (10), weighted by values ($a_i$), is used to influence the comparison which is carried out in the comparison unit (9) and the comparison unit (9) which forms a new check sum (CRC') with each received signal to be newly added and compares this new check sum (CRC') with data which are regarded as the associated received check sum (CRC);
- determining the position of the data packet in the serial data stream from the comparison of the new check sum (CRC') and the associated received check sum (CRC); and
- eliminating, during the comparison, the influence of all data which are not associated with the check data and the check sum (CRC).

17. Method according to claim 16, characterized in that the comparison for identification of the check sum (CRC) is interrupted between bundles (B1, B2, . . . ) in which data packets (P1, P2, . . . , P6) are entirely or partially located.

18. Method according to claim 17, characterized in that the comparison unit (9) is reset after each bundle.

19. Method according to claim 16, characterized in that, after interruption of the comparison, the data which are present in the delay unit (10) are transmitted on the one hand to the next unit and on the other hand back to the input of the delay unit (10) and to the input of the comparison unit (9).

* * * * *